(12) United States Patent
Jokelainen

(10) Patent No.: US 11,682,324 B2
(45) Date of Patent: Jun. 20, 2023

(54) STAND FOR A TOUCH SCREEN DEVICE

(71) Applicant: Jarkko Jokelainen, Espoo (FI)

(72) Inventor: Jarkko Jokelainen, Espoo (FI)

( * ) Notice: Subject to any disclaimer, the term of this patent is extended or adjusted under 35 U.S.C. 154(b) by 737 days.

(21) Appl. No.: 16/603,423

(22) PCT Filed: Mar. 20, 2018

(86) PCT No.: PCT/FI2018/050204
§ 371 (c)(1),
(2) Date: Oct. 7, 2019

(87) PCT Pub. No.: WO2018/185364
PCT Pub. Date: Oct. 11, 2018

(65) Prior Publication Data
US 2020/0152098 A1    May 14, 2020

(30) Foreign Application Priority Data

Apr. 7, 2017 (FI) ...................................... 20175321

(51) Int. Cl.
*G09F 13/04* (2006.01)
*A47B 97/04* (2006.01)
(Continued)

(52) U.S. Cl.
CPC .......... *G09F 13/0413* (2013.01); *A47B 97/04* (2013.01); *F16M 11/10* (2013.01);
(Continued)

(58) Field of Classification Search
CPC ..... G09F 13/0413; A47B 97/04; A47B 91/00; G06F 3/041; F16M 11/18; F16M 11/42; F16M 11/10; B60B 33/00; B43L 5/00
See application file for complete search history.

(56) References Cited

U.S. PATENT DOCUMENTS 1,050,352 A   1/1913  Deutschman et al.
4,050,352 A   9/1977  Tassie
(Continued)

FOREIGN PATENT DOCUMENTS

CN   202434170 U   9/2012
CN   203746265 U   7/2014
(Continued)

OTHER PUBLICATIONS

Anonymous: "Double Sided Dry Erase Board with wheels—PVC Coated Steel—Choose Size" Learner Supply, XXP055833639, Apr. 9, 2015, 3 pages.
(Continued)

*Primary Examiner* — Tan Le
(74) *Attorney, Agent, or Firm* — Ziegler IP Law Group

(57) ABSTRACT

A stand for a touch screen device, including a base including at least two wheels, wherein the wheels are retractable within the base. The stand also includes a frame including a first end and a second end, attached by its first end to the base. Furthermore, the stand includes a support for the touch screen device, attachable to the frame at the proximity of the second end of the frame. The support includes means for rotating the support with respect to the frame and means for locking the support with respect to the frame. The stand also includes a battery and means for connecting the battery to the touch screen device.

8 Claims, 5 Drawing Sheets

(51) Int. Cl.
*G06F 3/041* (2006.01)
*F16M 11/10* (2006.01)
*F16M 11/18* (2006.01)
*F16M 11/42* (2006.01)
*B60B 33/00* (2006.01)
*B43L 5/00* (2006.01)
*A47B 91/00* (2006.01)

(52) U.S. Cl.
CPC ............. *F16M 11/18* (2013.01); *F16M 11/42* (2013.01); *G06F 3/041* (2013.01); *A47B 91/00* (2013.01); *A47B 2220/0091* (2013.01); *B43L 5/00* (2013.01); *B60B 33/00* (2013.01)

(56) References Cited

U.S. PATENT DOCUMENTS

| | | | | |
|---|---|---|---|---|
| 8,539,889 | B1* | 9/2013 | Khalaf Allah | A47B 85/06 108/115 |
| 9,933,106 | B2* | 4/2018 | Stark | B62B 3/10 |
| 2007/0227409 | A1* | 10/2007 | Chu | A47B 21/00 108/50.02 |
| 2012/0024329 | A1* | 2/2012 | Ma | F16M 7/00 280/30 |
| 2013/0200246 | A1* | 8/2013 | VanBenschoten | B60B 33/063 248/519 |
| 2013/0200579 | A1* | 8/2013 | Abernethy | B62B 3/001 280/6.15 |
| 2014/0268532 | A1 | 9/2014 | Nicol et al. | |
| 2017/0232783 | A1* | 8/2017 | Oh | B60B 33/06 434/408 |

FOREIGN PATENT DOCUMENTS

| | | | |
|---|---|---|---|
| CN | 204480248 U | 7/2015 | |
| DE | 2705958 A1 | 8/1978 | |
| EP | 2626273 A2 * | 8/2013 | ............. A47B 21/02 |
| EP | 2626273 A2 | 8/2013 | |
| GB | 2491565 A | 12/2012 | |
| JP | 11115381 A * | 4/1999 | |
| KR | 101274051 B1 | 6/2013 | |
| WO | 9103194 A1 | 3/1991 | |
| WO | 201235362 A1 | 3/2012 | |
| WO | 2016060402 A1 | 4/2016 | |

OTHER PUBLICATIONS

European Patent Office, Communication pursuant to Article 94(3) EPC, Application No. 18714554.5-1203, dated Sep. 6, 2021, 9 pages.
International Search Report and Written Opinion of the International Searching Authority, Application No. PCT/FI2018/050204, dated Jun. 8, 2018, 14 pages.
International Preliminary Report on Patentability, Application No. PCT/FI2018/050204, dated Jul. 16, 2019, 13 pages.

* cited by examiner

STAND FOR A TOUCH SCREEN DEVICE

TECHNICAL FIELD

The aspects of the disclosed embodiments relate generally to an adjustable stand, and more specifically, to a stand for a touch screen device.

BACKGROUND

Touch screen devices, such as eReader devices, tablets, mobile phones, cameras, notebook computers, miniature TVs and the like are not typically stable on their own when they are placed in a vertical or inclined position, which is inconvenient for usage. Hence they are prone to fall when disturbed. The touch screens are typically fragile, so they can easily get damaged and break when they fall. There are various conventional hard-shell and soft-shell stands that are available for touch screen devices that lend stability to and protect such devices from falling down. Some of these also allow a certain degree of flexibility in positioning these touch screen devices at different angles towards the user when they are being used for viewing content, providing inputs such as gestures, typing etc., however they are limited in terms of portability, usability and functionalities.

Further, stands that are currently in use are generally awkward, bulky or ineffective. Some stands are equipped with wheels to enable easy movement, however as the device screen is touched, the stand starts to oscillate precariously, and may even fall down. Further, when a stand is equipped with wheels, the base of the stand becomes taller (e.g. by 5-10 cm), which makes device usage and movement cumbersome and can lead to the users tripping over the stand.

Document WO 2012/035362 discloses mobile public display device comprising a wheeled base defining a housing, a screen unit and a receiver for wirelessly receiving signals from an external transmitter, which signals include data representing the content to be displayed. The display device is also furnished with a controller for processing the signals and causing the content to be displayed on the screen unit and a battery located in the housing and adapted to power the controller. Document CN 203746265 presents a display comprising a shell, a main display screen, a base, sound boxes, a scanner and a console. The shell is connected with the base through supporting bars and universal wheels are arranged below the base. Document CN 204480248 discloses a self-service information inquiring machine based on a touch control technique comprises an inquiring cabinet body. A computer is arranged in the body and connected with a display screen and a touch screen. The body is arranged on a rotary disk, also comprising an idler wheel. Document CN 202434170 presents a publicizing device comprising a bracket, a ceiling and an LED (Light Emitting Diode) electronic screen. Universal wheels are arranged at the bottom of the device. Document US 2014/268532 discloses an electronic display assembly comprising a flexible electronic display screen that may be rolled onto a reel in a retracted configuration and extend from the reel in an extended configuration. Document EP 2626273 presents an accessory cart comprising a base, a housing element that is connected to the base and extends upward from the base, and a platform, which is connected to the housing element with the height of the platform being automatically adjustable. The base may include four swivel wheels and a retractable fifth tracking wheel centrally located, and a wireless recharging system for a battery.

Therefore, in light of the foregoing discussion, there exists a need to overcome the aforementioned drawbacks in existing stands such as instability and increased height of the base of the stand, which makes the stand and the device cumbersome to use.

SUMMARY

The aspects of the disclosed embodiments provide for a stand for a touch screen device, comprising
- a base comprising at least two wheels, wherein the wheels are retractable within the base;
- a frame comprising a first end and a second end, attached by its first end to the base;
- a support for the touch screen device, attachable to the frame at the proximity of the second end of the frame, comprising
- means for rotating the support with respect to the frame, and
- means for locking the support with respect to the frame;
- a battery and means for connecting the battery to the touch screen device.

The aspects of the disclosed embodiments also provide a system comprising a stand as described above and a touch screen device.

Embodiments of the present disclosure substantially eliminate or at least partially address the aforementioned problems in the prior art, for example by enabling retracting the wheels underneath a base of the stand to taper the height of stand and thus increase stability of the base of the stand and the stand as a whole, in order to prevent the stand and hence the touch screen device from falling when the touch screen device is touched.

Additional aspects, advantages, features and objects of the disclosed embodiments are made apparent from the drawings and the detailed description of the illustrative embodiments construed in conjunction with the appended claims that follow.

It will be appreciated that features of the disclosed embodiments are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
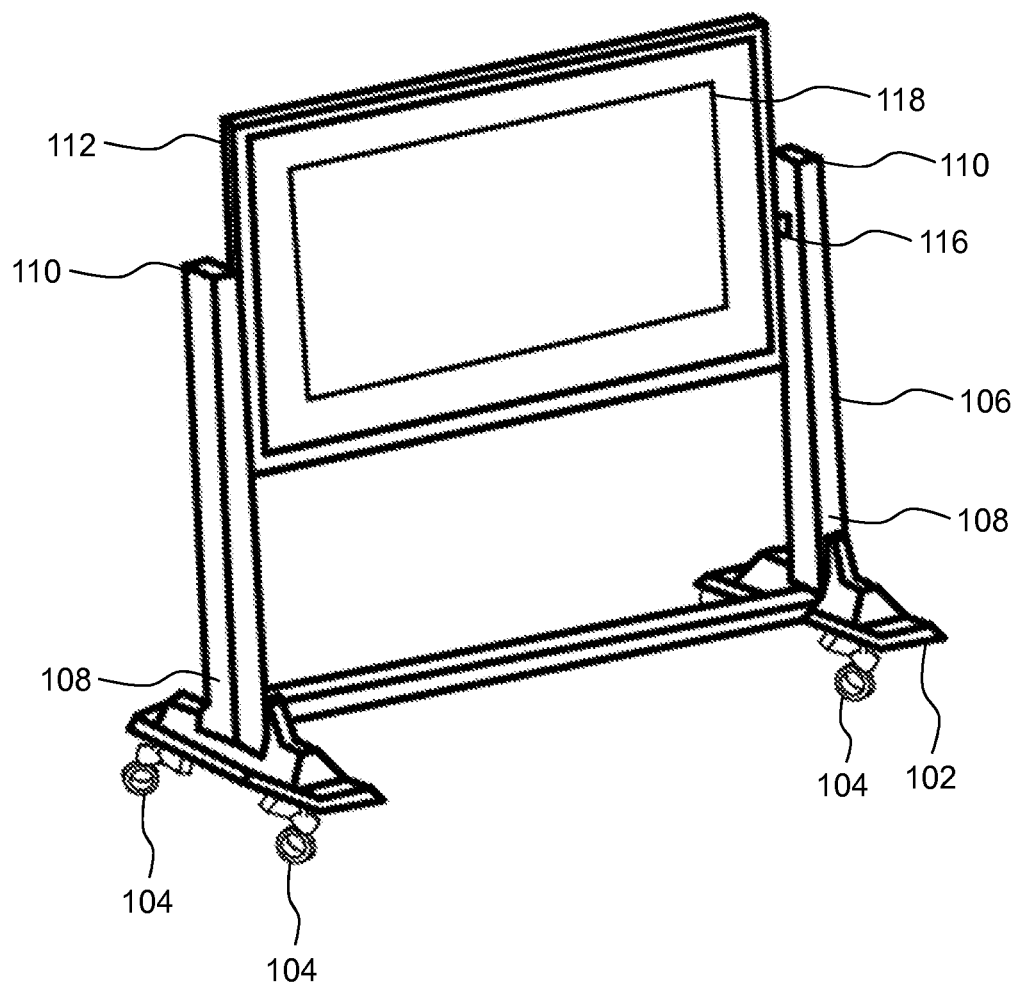
FIG. 1 is a schematic illustration of a stand for a touch screen device in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a stand for a touch screen device, comprising
- a base comprising at least two wheels, wherein the wheels are retractable within the base;
- a frame comprising a first end and a second end, attached by its first end to the base;
- a support for the touch screen device, attachable to the frame at the proximity of the second end of the frame, comprising
- means for rotating the support with respect to the frame,
- means for locking the support with respect to the frame; and
- a battery and means for connecting the battery to the touch screen device.

One key advantage of the present stand is that the wheels are arranged underneath the base of the stand and may be retracted inside the base. Thus, the height of the base is tapered when the wheels are retracted and this increases the stability of the base and the stability of the whole stand. Furthermore, as the wheels are retracted, the stand is less prone to move when the touch screen is touched. When the height of the base is made tapered, the height of the base of the stand may be reduced to as low as 1-2 centimetres. The present stand may be moved around with the help of the wheels, but it can also easily be made to stand still. The stand may be used in various places (e.g. schools, offices, seminar halls etc.). The stand may enable the touch screen device to be tilted to various positions (e.g. a vertical position, a horizontal position or inclined between the vertical and the horizontal position). The touch screen device may a tablet, an electronic reader, a mobile phone, a camera, a notebook computer, a miniature TV or an interactive display.

In an embodiment, the base of the stand comprises at least two wheels. The base may also comprise three wheels. In another embodiment, the base comprises four wheels, including more than four wheels. The base extends to at least one direction with respect to the frame, but it may extend to more than one direction, such as two, three, four or five directions. Typically the base is essentially on one plane that is perpendicular to a plane in which the frame is essentially arranged. When the base extends to more than one direction, the distribution is typically symmetrical with respect to the frame, i.e. that for example the base extends to two opposition directions with respect to the frame.

According to yet another embodiment, the wheels are retractable within the base by mechanical means, electronic means, hydraulic means or pneumatic means. For example, electronically actuated lead screws, linear actuators, powered ball screws, scissor lifts or other types of lifts such as pneumatic lifts or hydraulic lifts. There may be one or more such means per wheel, or even only one such means per stand or one such means per two wheels.

The electronic means may comprise any kind of processor and/or controller. In an embodiment, the wheels are retracted within the base using any hydraulic means (e.g. hydraulic forces). The wheels may be retracted within the base using for example a spring mechanism.

The stand and its various parts may be made of any suitable material, such as metal, wood, plastic or fibre-reinforced plastic. The various parts of the stand may be made of the same material or several materials may be combined within the stand and even its parts.

The support for the touch screen device is attachable to the frame at the proximity of the second end of the frame. The term proximity refers to a location that is closer to the second end of the frame than to the first end of the frame. The support may be attached to the frame at a location between a middle of the frame (i.e. at the centre between the first end of the frame and the second end of the frame) and the second end of the frame. The support for the touch screen device may be integrated in the frame of the touch screen device or it may be a separate part. It may for example be a bar-like element arranged on the back of the touch screen device, preferably parallel to its sides (for examples the sides that are the longest), and most preferably approximately in the middle of the frame of the touch screen device. It may also be for example a bar-like element arranged on the frame of the stand, comprising means for removably attaching the frame of the touch screen device to it, as are discussed in more detail below.

According to an embodiment, the height of the frame is adjustable. In an embodiment, the height of the frame is adjusted to provide convenient visibility of the touch screen device for viewers. The frame may thus comprise for example a telescopic frame for adjusting the height of the stand. According to another embodiment, the frame has a general shape of H comprising two first ends and two second ends, and the stand comprises two bases attached to the first ends of the frame, each comprising at least two wheels. The frame may also be made of any other suitable shape with two first ends and two second ends. In an embodiment, the two bases are attached to the first ends of the frame using the attachment means. The frame may also have the shape of a vertical bar, wherein the base may be extending in one, two, three or four directions, in order to keep the frame standing.

In an embodiment, the first end of the frame is attached to the base using an attachment means. The attachment means may comprise one or more of screws, hinges, nails, hooks and loop fasteners, or at least one adhesive material (e.g. glue). The frame may also be welded to the base.

The means for removably attaching the touch screen device to the support may comprise snap locks on two sides of the support to attach the touch screen device to the support. In an embodiment, the support may function as a snap lock. In another embodiment, the support into which the touch screen device is arranged comprises one or more rotatable bars. The one or more bars may be attached to the support and turned to lock the touch screen device into a desired position. The means for removably attaching may also comprise a combination of a nut and screw, hook and loop fasteners, clips, clamps, straps, ties, pins, vacuum rubbers, clasp, belts or the like. The means for removably attaching may comprise magnets to attach the touch screen device to the support. The means for removably attaching may yet further comprise a sliding lock mechanism to attach the touch screen device to the support.

In an embodiment, the means for rotating may comprise mechanical, electric or pneumatic rotating means. The means for rotating may enable rotation about a rotational axis of the touch screen device. The means for rotating may comprise a rotating pin, a rotating hinge, a barring assembly, a rotating pulley, a toothed wheel in cooperation with a toothed rim and/or a rotating electric motor. The means for connecting the battery to the touch screen device may be any such connecting means as known to a person skilled in the art.

The stand may also be equipped with means for locking the position of the support, as well as of the frame for adjusting the height of the stand. The means for locking the support may comprise for example a rotatable a fork-like bar. The fork-like bar may be attached to the support, and may be turned such that the support is locked between the forks. The means for locking the support may comprise a locking pin, a clip, a spring locking pin, a slic pin, a self locking pin etc.

The stand may be equipped with a charging station for charging the touch screen device. In an embodiment, the touch screen device may be charged by connecting the charging station of the stand to power mains. The stand comprises a battery, which may be arranged for example inside the base of the stand for charging the touch screen device. The battery may be connected to the power mains for charging the battery. The battery may be connected to the touch screen device using a means for connecting, which may in turn comprise electrical power cables. In an embodiment, the touch screen device comprises a battery to power it, which may be a rechargeable battery (e.g. secondary cells) or a non-rechargeable battery (e.g. primary cells). The battery may be nickel cadmium (NiCd) battery, a nickel-metal hydride (NiMH) battery, a lead acid battery, a lithium ion battery and/or a lithium polymer battery.

According to yet another embodiment, the stand further comprises means for connecting the stand to power mains. The means for connecting the stand to the power mains may comprise electrical power cables. This means for connecting the stand to power mains enables charging the battery of the stand, and it may also be used for directly providing electricity to the touch screen device.

In an embodiment, the stand comprises more than one battery, such as two, three, four, five or six batteries. The batteries may be located either in the base of the stand or in the frame of the stand. The stand may be integrated with a charger for charging the one or more batteries. In an embodiment, the stand is electrically coupled with an external charger for charging the one or more batteries. The one or more batteries may be ideally charged in a balanced way. Similarly, the touch screen device may also be ideally charged in a balanced way when it needs to be charged.

According to yet another embodiment, the stand further comprises a computer that is connectable to the touch screen device. In an embodiment, the stand may comprise at least one of a smartphone, a laptop, an electronic notebook, an electronic reader etc that is electrically connectable to the touch screen device.

According to yet another embodiment, the stand further comprises a board for writing. According to yet another embodiment, the board for writing is a blackboard or a whiteboard. In an embodiment, a backside of the support for the touch screen device comprises a whiteboard or a blackboard for writing. According to yet another embodiment, the board for writing can be arranged on the support, on an opposing side with respect to the touch screen device. Viewers may view the board when the user tilts the support to the opposite side.

The present disclosure also provides a system comprising a stand as described above and a touch screen device. The advantages of the present system are identical to those disclosed above in connection with the stand and the embodiments listed above in connection with the stand apply mutatis mutandis to the system.

Embodiments of the present disclosure may be used to increase stability of the base of the stand and stability of the whole stand by retracting the wheels within the base of the stand and prevent the stand from falling down and/or moving when the touch screen device is touched. Furthermore, the embodiments of the present disclosure taper the height of stand to possibly as low as 1-2 centimetres when the wheels are retracted within the base of the stand. The stand may be moved around with help of the wheels, while the stand for the touch screen device can also easily be made to stand still when the wheels are retracted inside the base.

DETAILED DESCRIPTION OF THE DRAWINGS

FIG. 1 is a schematic illustration of a stand for a touch screen device 118 in accordance with an embodiment of the present disclosure. The stand comprises a base 102 and a frame 106. The base 102 comprises at least two wheels 104. The frame 106 comprises two first ends 108 and two second ends 110. The frame of the touch screen 112 comprises means for removably attaching the touch screen device to the support (not shown, as arranged inside the frame of the touch screen) and means 116 for rotating the support with respect to the frame.

Figure 2:
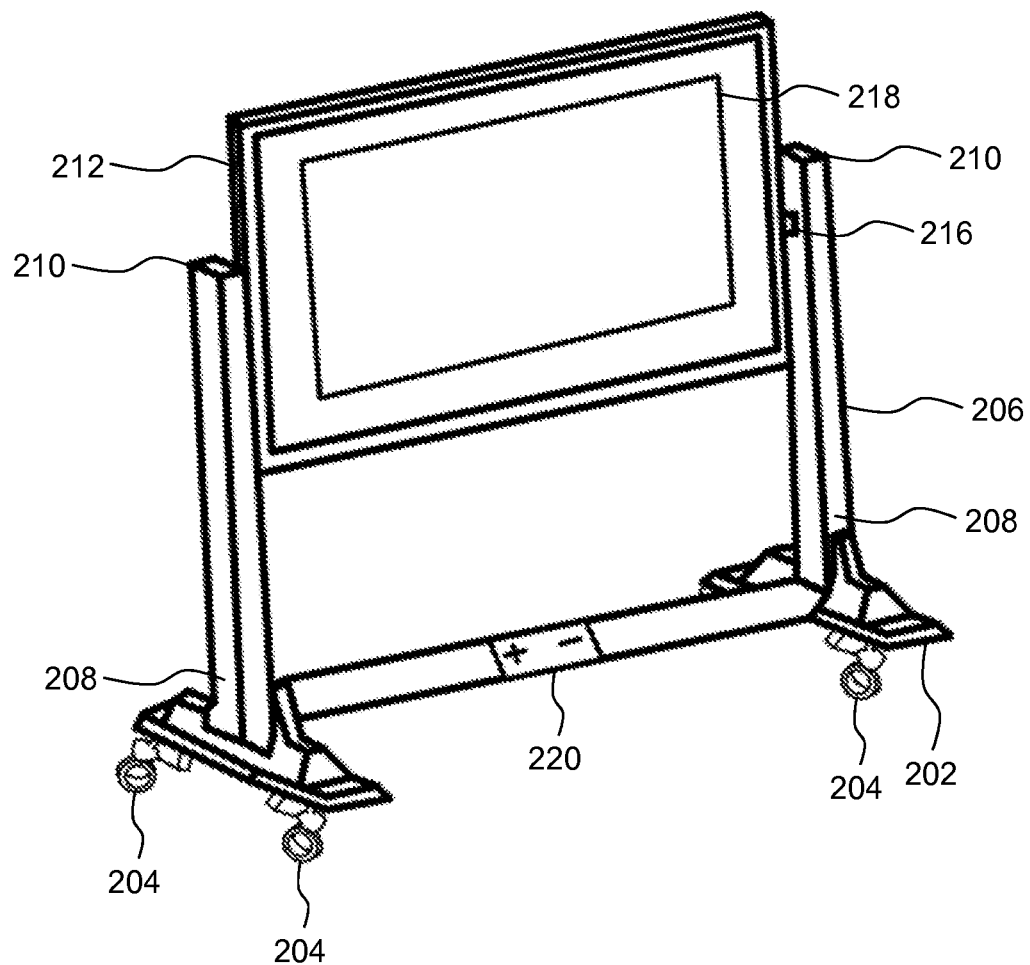
FIG. 2 is a schematic illustration of a stand comprising a battery in accordance with an embodiment of the present disclosure.

FIG. 2 is a schematic illustration of a stand comprising a battery 220 in accordance with an embodiment of the present disclosure. The stand comprises a base 202, a frame 206 and the battery 220. The base 202 comprises at least two wheels 204. The frame 206 comprises two first ends 208 and two second ends 210. The frame of the touch screen 212 comprises means 216 for rotating the support with respect to the frame.

Figure 3:
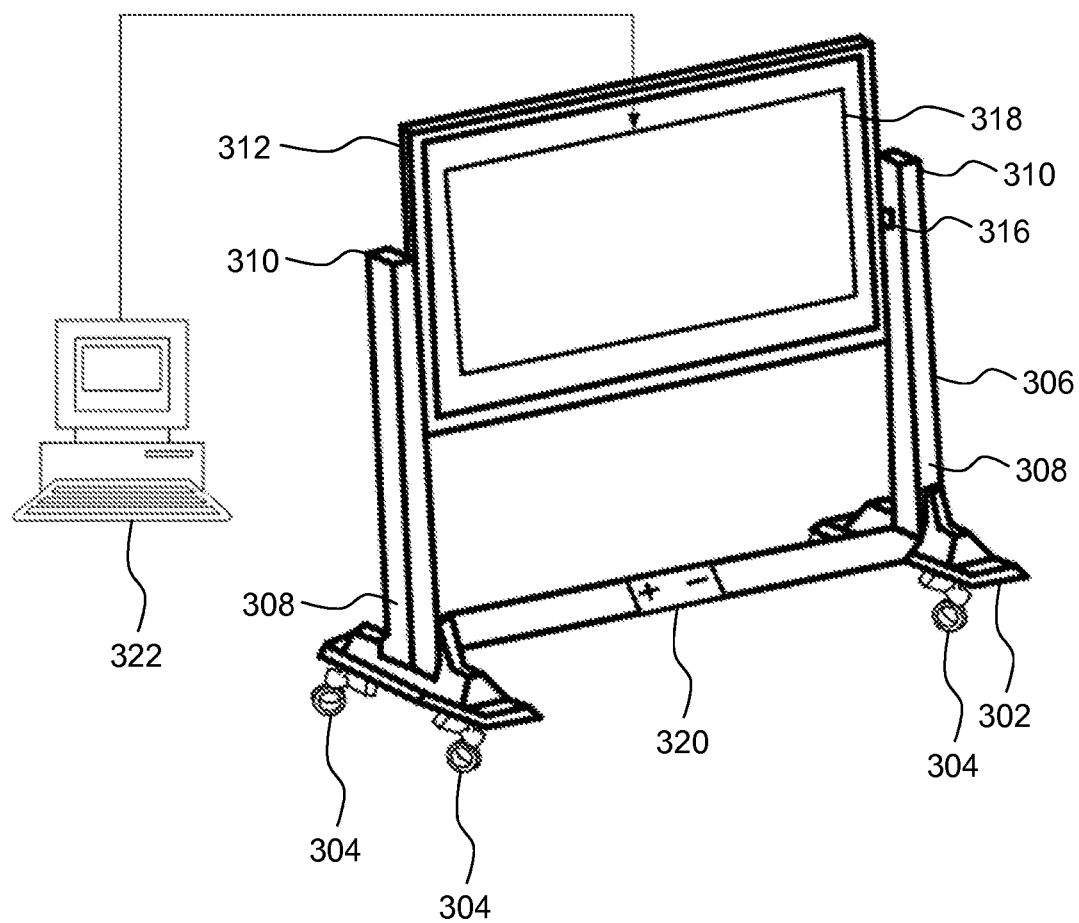
FIG. 3 illustrates a schematic illustration of a stand for a touch screen device in accordance with an embodiment of the present disclosure.

FIG. 3 illustrates a schematic illustration of a stand for a touch screen device 318 in accordance with an embodiment of the present disclosure. The stand comprises a base 302, a frame 306 and a battery 320. The base 302 comprises at least two wheels 304. The frame 306 comprises two first ends 308 and two second ends 310. The frame of the touch screen 312 comprises means 316 for rotating the support with respect to the frame. The stand further comprises a computer 322 that is connected to the touch screen device 318.

Figure 4:
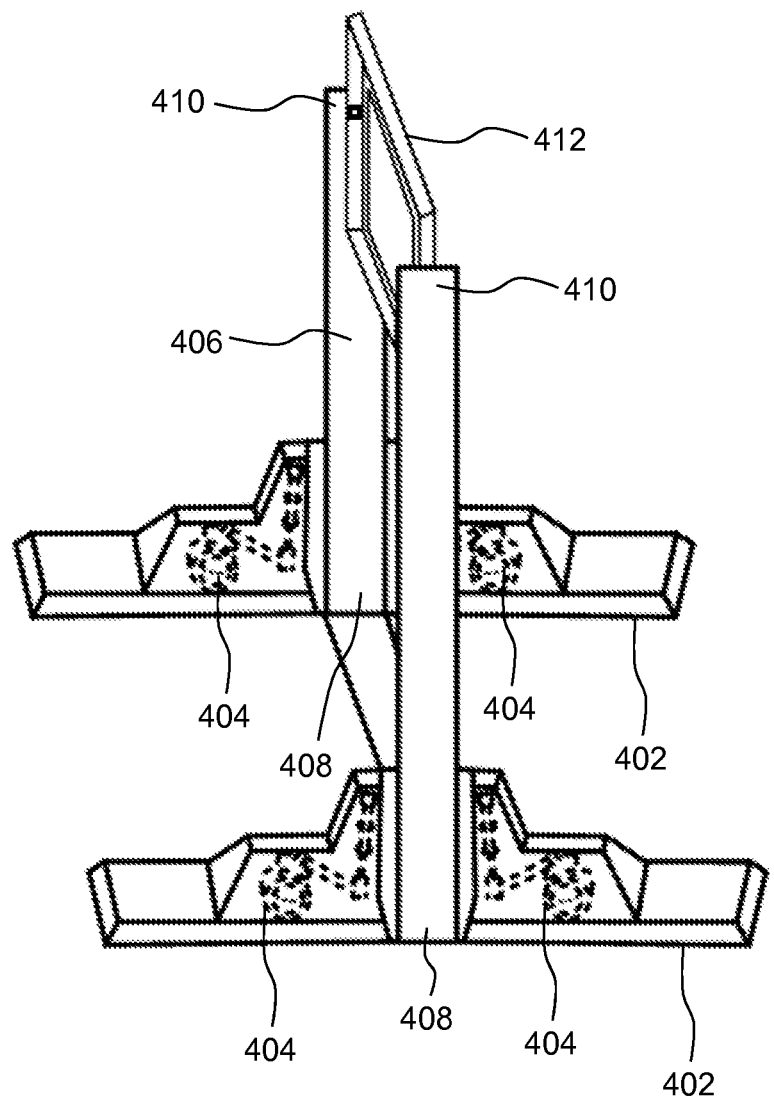
FIG. 4 is a sectional view of a base of a stand in accordance with an embodiment of the present disclosure.

FIG. 4 is a sectional view of a base 402 of a stand in accordance with an embodiment of the present disclosure. The stand comprises the base 402 and a frame 406. The base 402 comprises at least two wheels 404. The frame 406 comprises two first ends 408 and two second ends 410. As can be seen, the base extends to two opposition directions with respect to the frame. The frame forms a plane that is perpendicular to the plane formed by the base. Furthermore, a frame 412 of the touch screen device is illustrated.

Figure 5:
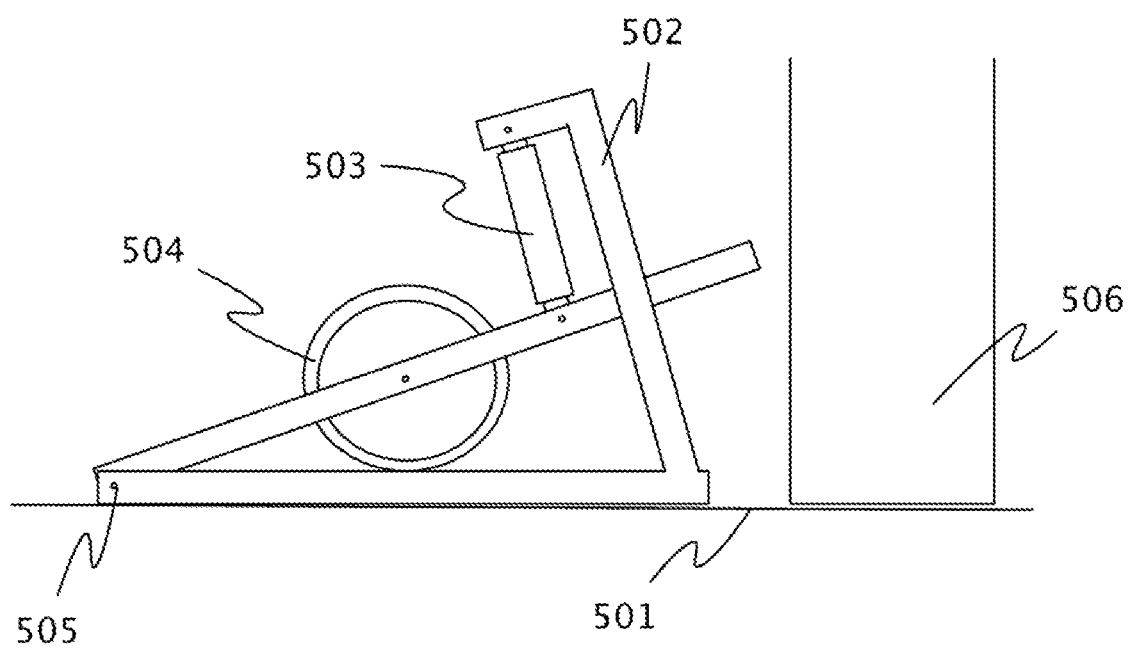
FIG. 5 is a schematic illustration of a retractable wheel.

FIG. 5 is a schematic side-view of a retractable wheel 504. The wheel 504 is arranged on a support structure 502 comprising two parts. One of the parts supports the wheel 504 and is attached at one end to the other part via a hinge 505, and at its other end also to the other part of the support structure, but via an actuator 503. The support structure is arranged in proximity of a part of the frame 506. In this FIG., the wheel is shown in it upper position with respect to the floor 501. When the actuator 503 is activated, the wheel 504 will drop through the support structure 502 to touch the floor. The wheel 504 may be for example an omni-directional wheel.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A stand for a touch screen device, comprising
    a base comprising at least two wheels;
    a single hydraulic actuator for retracting all wheels of the base;
    a frame comprising a first end and a second end, attached by its first end to the base by a hinge;
    a support for the touch screen device, attachable to the frame at the proximity of the second end of the frame;
    a board for writing arranged on the support on an opposing side of the touch screen device; and
    a battery and means for connecting the battery to the touch screen device, wherein the wheels are retractable within the base and the support comprises:
        means for rotating the support with respect to the frame; and
        means for locking the support with respect to the frame.

2. The stand according to claim 1, wherein the height of the frame is adjustable.

3. The stand according to claim 1, wherein
    the frame has a general shape of H comprising two first ends and two second ends; and
    the stand comprises two bases attached to the first ends of the frame, each comprising at least two wheels.

4. The stand according to claim 1, further comprising means for connecting it to a power mains.

5. The stand according to claim 1, further comprising a computer connectable to the touch screen device.

6. The stand according to claim 1, wherein the board for writing is a blackboard or a whiteboard.

7. A system comprising a stand according to claim 1, and a touch screen device.

8. The stand according to claim 3, wherein the battery is located between the two bases in a plane defined by the two bases.

* * * * *